(12) United States Patent
Raszkowski et al.

(10) Patent No.: US 6,447,565 B1
(45) Date of Patent: Sep. 10, 2002

(54) TRANSMISSION VENT ASSEMBLY

(75) Inventors: James Allen Raszkowski; Conrad L. Rockey, both of Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/847,132

(22) Filed: May 3, 2001

(51) Int. Cl.$^7$ .............................................. B01D 46/00
(52) U.S. Cl. ...................... 55/385.4; 55/385.3; 55/505; 55/510; 74/606 R; 220/371; 220/374
(58) Field of Search .......................... 55/320, 327, 329, 55/385.1, 385.4, 490, 504, 505, 510, 385.3; 74/606 R; 220/371, 373, 374

(56) References Cited

U.S. PATENT DOCUMENTS

| | | | |
|---|---|---|---|
| 4,256,474 A | * | 3/1981 | Berger, Jr. et al. ............. 55/482 |
| 5,088,947 A | | 2/1992 | Whitley II et al. |
| 5,348,570 A | | 9/1994 | Ruppert et al. |
| 5,372,594 A | * | 12/1994 | Colacello et al. ........... 55/385.4 |
| 5,409,526 A | * | 4/1995 | Zheng et al. ............. 55/385.4 |
| 5,509,949 A | | 4/1996 | Gluys et al. |
| 6,015,444 A | | 1/2000 | Craft et al. |
| 6,364,924 B1 | * | 4/2002 | Mashiko et al. ........... 55/385.4 |

* cited by examiner

Primary Examiner—David A. Simmons
Assistant Examiner—Minh-Chau T. Pham
(74) Attorney, Agent, or Firm—Leslie C. Hodges

(57) ABSTRACT

A transmission vent assembly includes an apparatus having a central, internal passage extending therethrough. The internal passage has a larger diameter portion defining a pocket. A filter is disposed in the pocket to condense and return fluid to the transmission through the internal passage. The apparatus includes a shoulder adjacent the upper surface and a double lead thread initiating at the shoulder and terminating at a lower end. The assembly further includes a cup-shaped cap, press fittingly disposed over the apparatus. The cap and shoulder define an annular cavity and the cap and the double lead thread define first and second threaded passages. The cap includes an outward impression in the closed end which cooperates with the upper surface of the apparatus to define a connecting passage. Two bi-directional air flow paths extend between the transmission and the atmosphere through the internal passage, connecting air passage, annular air cavity, and each of the two threaded passages.

10 Claims, 3 Drawing Sheets

ABSTRACT# TRANSMISSION VENT ASSEMBLY

TECHNICAL FIELD

The present invention relates to a transmission vent assembly to venting a vehicular transmission.

BACKGROUND OF THE INVENTION

In conventional vehicular transmissions, an air vent assembly is provided to allow air to flow into and out of the transmission housing during operation, referred to as transmission breathing. As heat is generated in the transmission, the temperature of the air and hydraulic fluid therein increases, and likewise the internal pressure increases. Without a vent for breathing, the increased internal pressure relative to the atmospheric exterior pressure may force fluid past the housing seals. When the internal temperature decreases relative to the exterior temperature, such as when a vehicle is driven through high water, the pressure differential is reversed and air flows into the transmission through the vent. Without the vent, contaminants such as dirt and water may be drawn into the transmission through the seals.

Thus a vent or breather is typically incorporated in transmissions to minimize pressure differentials between the interior and exterior. When designing the vent, it is desirable to avoid water ingestion into the transmission as this may contaminate the operation of hydraulically-actuated friction devices. Further it is advantageous to avoid transmission fluid vapor from escaping the confines of the transmission and condensing on the outer surface of the transmission housing. This may be perceived as a fluid leak by a customer and also reduces the volume of fluid inside the transmission. Bi-directional flow of air, i.e. flow into and out of the vent assembly, without use of expensive valves, is a sought-after solution to equalize the pressures.

Ease of assembly is also an important consideration. It is desirable to eliminate the need for a threaded hole in the transmission housing for securing the vent assembly in the housing.

SUMMARY OF THE INVENTION

The present invention is for a transmission vent assembly which permits free flow of air in and out of the transmission. While allowing free flow of air, the vent assembly resists water ingestion into and oil expulsion out of the transmission.

The transmission vent assembly comprises a vent apparatus and a cap. The vent apparatus has a cylindrical tube portion received in a mounting hole of a transmission housing and a vent body portion integral and adjacent to the tube portion and having an exterior cylindrical surface of greater diameter than the tube-portion. A central bore defining an internal passage extends through a lower end of the tube to an upper surface of the vent body. The central bore has a larger diameter portion defining an open ended pocket formed in the upper surface of the vent body. Disposed in the open ended pocket is a filter to capture and condense fluid vapor and return fluid to the transmission through the internal passage.

The vent body includes a shoulder about the exterior cylindrical surface adjacent the upper surface and a double lead thread about the exterior cylindrical surface initiating at the shoulder and terminating at a lower end of the vent body.

The cap, formed in a cup-shape, is press fittingly disposed over the vent body. The cap has a closed end seated on the upper surface of the vent body and a cylindrical wall extending therefrom about the exterior cylindrical surface of the vent body. The cap and the shoulder cooperate to form an annular air cavity and the cap and the double lead thread cooperate to define a first and a second threaded passage. The cap further includes an outward impression in the closed end which cooperates with the upper surface of the vent body to define a connecting air passage.

Two bi-directional air flow paths extend between the transmission and the atmosphere through the internal passage, the connecting air passage, the annular air cavity, and each of the two threaded passages, for equalizing pressure in the transmission to the atmosphere. The two threaded passages minimize water ingestion into the transmission through pressure suction or by splashing.

DESCRIPTION OF THE PREFERRED EMBODIMENT

Figure 1:
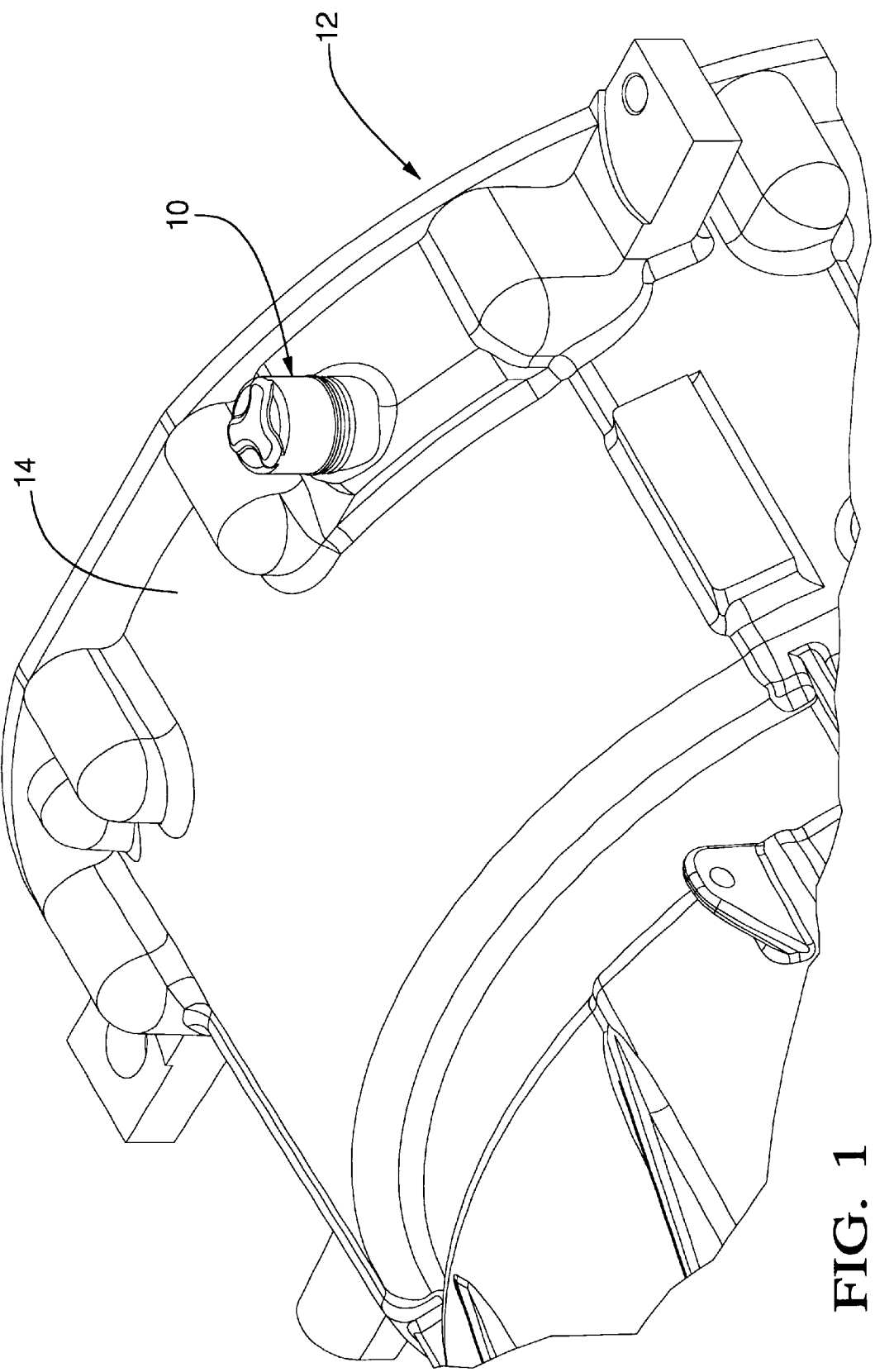
FIG. 1 is a perspective view of a transmission vent assembly installed in a transmission housing.

The present invention transmission vent assembly 10 is incorporated in a transmission 12, a portion of which is shown in FIG. 1. The vent assembly 10 is installed in an upper surface of a transmission housing 14 in a generally vertical orientation.

Figure 2:
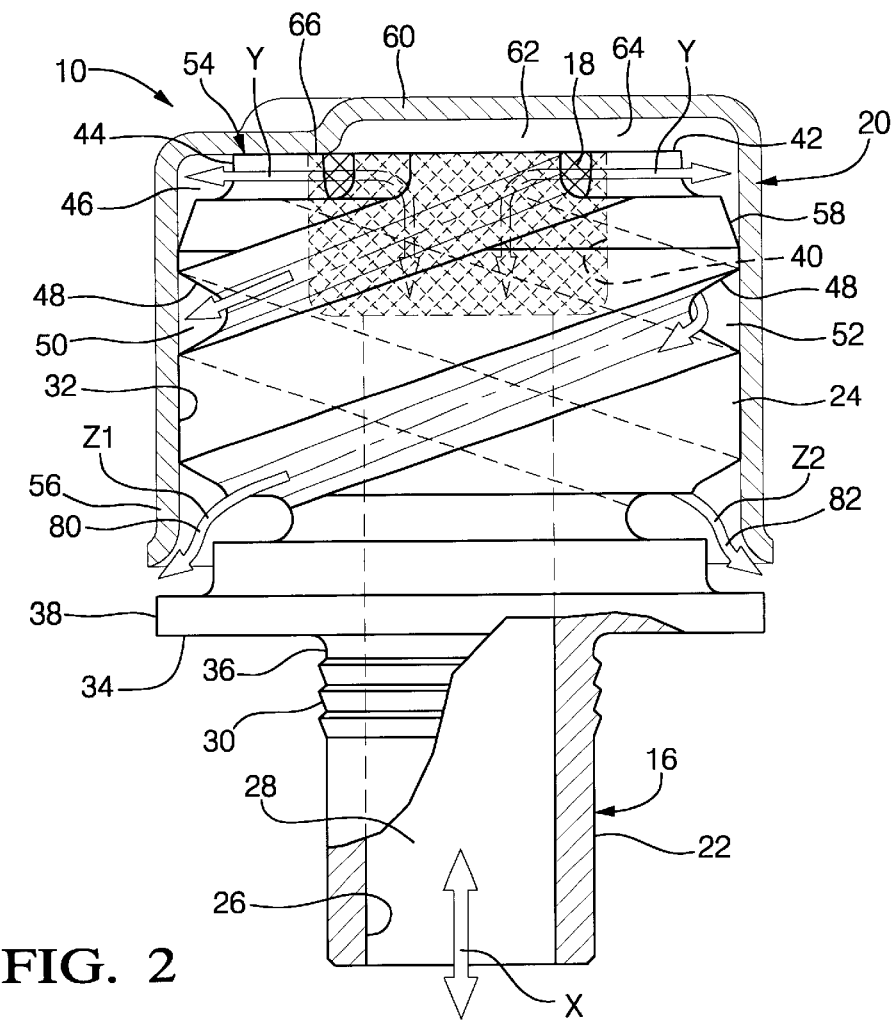
FIG. 2 is a sectional view of the transmission vent assembly of the present invention.

Referring now to FIG. 2, a cross sectional view of the vent assembly 10 is illustrated. The vent assembly 10 includes three main components: a vent apparatus 16, a filter 18 fitted in the vent apparatus 16, and a cap 20 snapped over the vent apparatus. The vent apparatus 16 is comprised of a cylindrical tube portion 22 and a vent body portion 24. A central bore 26 defining an internal passage 28 extends through the length of the vent apparatus 16. The cylindrical tube portion 22 is received in a mounting hole, not shown, in the transmission housing 14. It is preferable for the vent assembly 10 to be press fittingly received in the mounting hole, with serrations 30 about the tube portion 22 to aid retention, as opposed to a threaded connection.

The vent body portion 24 is integral and adjacent to the cylindrical tube 22 and has a larger diameter exterior cylindrical surface 32 than the cylindrical tube. The vent body 24 includes a seating surface 34 extending radially outward from the upper end 36 of the tube 22 to mate with the transmission housing 14 and provides a positive stop for the insertion of the vent assembly 10 in the housing. The vent body seating surface 34 extends radially to at least the inner diameter of the cap 20 thereby creating an annular flange 38, which may act as a water deflector to block water from spraying up under the cap.

An open ended pocket 40 is formed in the upper surface 42 of the vent body 24, where the pocket is a larger diameter portion of the bore 26 extending through the vent apparatus 16. The filter 18 is a cylindrical component which is disposed in and fills the pocket 40. The filter 18 captures fluid vapor, condenses it, and returns it to the transmission 12 through the internal passage 28 to reduce fluid expulsion through the vent assembly 10. The filter 18 may be any material that is suitable in a transmission operating environment and which facilitates the function of the filter.

Suitable materials include a polyester mesh, such as polyethylene, or a metal mesh, such as aluminum or stainless steel wire mesh.

A shoulder 44 is machined about the exterior cylindrical surface 32 of the vent body 24 adjacent the upper surface 42, which when assembled with the cap 20, defines an annular air cavity 46. A double lead thread 48 is also machined into the exterior cylindrical surface 32 of the vent body 24 and initiates from the annular cavity 46 and terminates adjacent to and above the water deflector flange 38 of the vent body. Each of the threads 48 of the vent body 24, in cooperation with the cap 20, define first and second threaded air passages 50 and 52 respectively.

The cap 20 of the vent assembly 10 is cup-shaped and oriented inverted over the vent body 24. The cap 20 has a closed end 54 to seat on the upper surface 42 of the vent body 24 and a cylindrical wall 56, which is press fit about the exterior cylindrical surface 32 of the vent body. The cylindrical wall 56 extends close to the water deflecting annular flange 38 to minimize water ingestion into the vent assembly 10. To assist press fitting the cap 20 over the vent body 24, the leading edge 58 of the body may be chamfered such as at a twenty degree angle.

Figure 3:
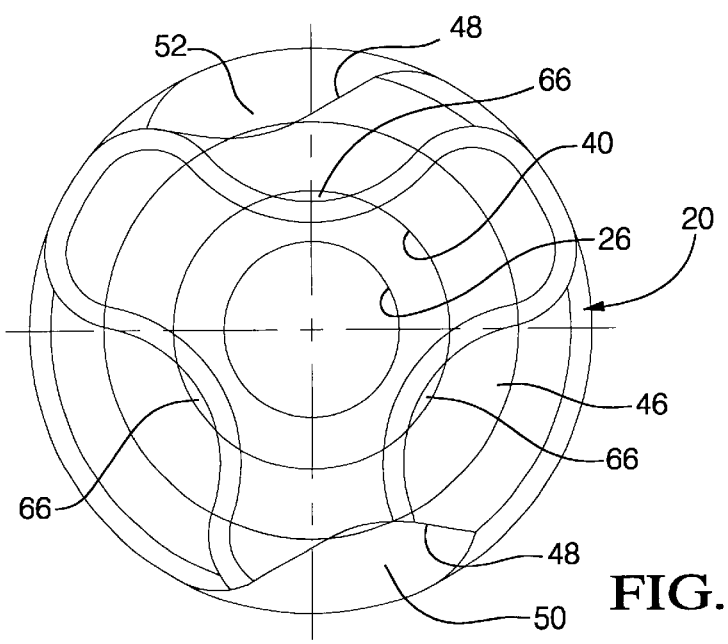
FIG. 3 is a plan view of the vent assembly.

As shown in FIGS. 2 and 3, the cap 20 has an outward impression 60 stamped in the closed end 54. A plenum 64 is defined as the space between the filter 18 and the cap impression 60, situating it in flow communication with the internal passage 28. The cap impression 60 and upper surface 42 of the vent body 24 define connecting air passages 64, which extend radially from the plenum 62 to the annular air cavity 46 for flow distribution to the threaded air passages 50,52. Here the cap 20 is impressed to provide three connecting passages 64 equally distributed as spokes. The geometry also allows for three supporting areas 66 for the closed end 54 of the cap 20 to press against the filter 18 to securely hold the filter in the pocket 40.

Figure 4:
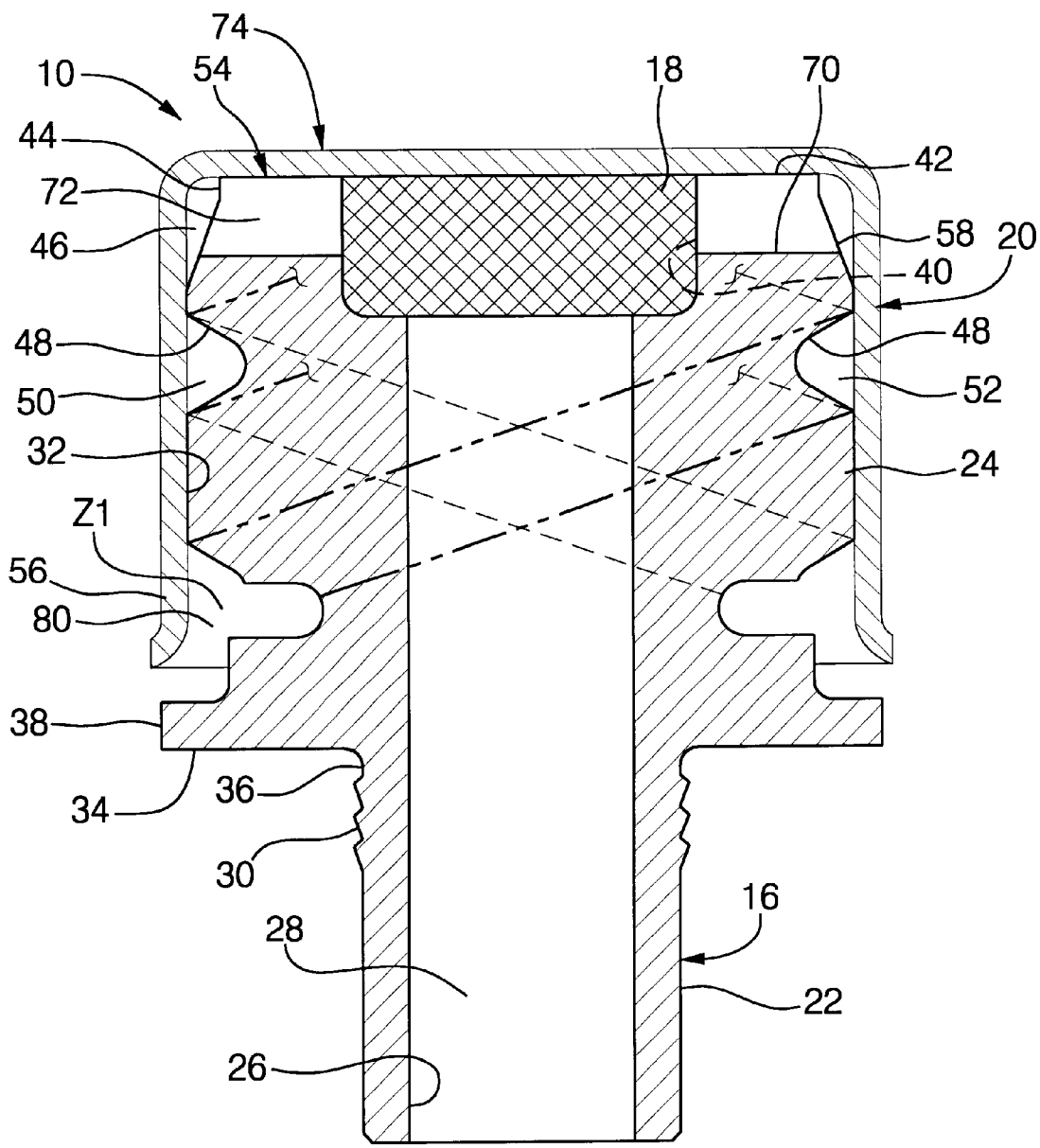
FIG. 4 is a sectional view of a second embodiment of a transmission vent assembly.

As an alternative to a cap impression, a slot 70 may be machined in the upper surface 42 of the vent body 24 from the open ended pocket 40 to the double lead thread 48 as shown in FIG. 4. The slot 70 and cap 20 define the connecting air passage 72 between the internal passage 28 of the vent apparatus 16 and the threaded air passages 50,52 about the exterior of the vent body 24. The cap 20 has a flat closed end 74 to support the filter 18 in the vent body pocket 40. This alternative provides the same function as having the connecting passages impressed in the cap.

The vent assembly 10 shown in FIG. 2 has two bidirectional flow paths 80 and 82 through which air may pass either out of the transmission 12 to the atmosphere or into the transmission. The flow paths are illustrated diagrammatically by arrows X, Y, and Z. Both flow paths 80,82 begin at arrow X in the transmission 12 and proceed through the internal passage 28 in the vent tube 22 and body 24, through the filter 18, to the plenum 62 where air is distributed to the annular air cavity 46 through the connecting passages 64 shown as arrow Y. The flow paths 80,82 diverge in the annular air cavity 46 where the first flow path 80 follows the first thread passage 50 shown by arrow Z1. The second flow path 82 follows the second thread passage 52 shown by arrow Z2 out to the atmosphere.

During operation, as the temperature and pressure rise inside the transmission 12, air and fluid vapor within the transmission are forced into the vent assembly 10, through the internal passage 28 and filter 18. The fluid vapor collects and condenses in the filter 18 and returns to the transmission 12 through the internal passage 28. The filter 18 aids in minimizing fluid expulsion from the transmission 12. After the air passes through the filter 18, it reaches the plenum 62 and is distributed to the annular air cavity 46 via the connecting passages 64. There the air may follow the first or second flow paths 80,82 created by the double threaded passages 50,52. The air is able to escape the transmission 12 through the vent assembly 10 and thereby operates to equalize the interior pressure to the atmosphere. The vent assembly 10 also facilitates filling the transmission with oil by providing paths for the air to escape.

If the atmospheric pressure is greater than the interior transmission pressure, air flows under the cap 20, through the two threaded passages 50,52, the connecting air passages 64, and the filter 18, to the transmission 12 through the internal passage 28. Since there are two threaded flow passages 50,52, it reduces the likelihood that both passages would be submerged in water, which may create a vacuum drawing water into the vent assembly 10. The complex threaded passages minimize water flow into the transmission, which could contaminate the operating fluid. The annular flanged water deflector 38 about the vent body 24 also minimizes the likelihood of water spray entering the vent assembly 10.

The transmission vent assembly 10 has a simple construction with no moving parts to add noise or complexity. It is easy to assemble with only three components: the vent apparatus 16, the filter 18 placed into the pocket 40 of the vent, and the cap 20 press fit over the vent apparatus to retain the filter therein. The vent assembly 10 is press fit into the transmission housing 14 without the need for threads or fasteners.

The double threaded flow passages 50,52 permit sufficient air flow into and out of the transmission, while the added complexity of the flow paths inhibits water ingestion. Oil expulsion is minimized by placing the filter at the upper end of the internal passage which allows direct flow back into the transmission of collected fluid.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A transmission vent assembly for venting a vehicular transmission comprising:

a vent apparatus having a cylindrical tube portion received in a mounting hole of a transmission housing, a vent body portion integral and adjacent to said tube portion and having an exterior cylindrical surface of greater diameter than said tube portion, and a central bore defining an internal passage extending through a lower end of said tube to an upper surface of said vent body, said central bore having a larger diameter portion defining an open ended pocket formed in said upper surface of said vent body;

a filter disposed in said open ended pocket to capture and condense fluid vapor and return fluid to said transmission through said internal passage;

said vent body including a shoulder about said exterior cylindrical surface adjacent said upper surface and a double lead thread about said exterior cylindrical surface initiating at said shoulder and terminating at a lower end of said vent body;

said transmission vent assembly further comprising a cap, formed in a cup-shape and press fittingly disposed over said vent body, and having a closed end seated on said upper surface of said vent body and a cylindrical wall extending therefrom about said exterior cylindrical surface of said vent body, said cap and said shoulder cooperate to form an annular air cavity and said cap and said double lead thread cooperate to define a first and a second threaded passage, said cap further including an outward impression in said closed end which cooperates with said upper surface of said vent body to define a connecting air passage; and two bidirectional air flow paths extending between said transmission and the atmosphere through said internal passage, said connecting air passage, said annular air cavity, and each of said two threaded passages, for equalizing pressure in said transmission to the atmosphere.

2. The transmission vent assembly, as defined in claim 1, wherein said outward impression of said cap and said filter define a plenum portion and said connecting passage is formed as three spokes extending from said plenum radially outward to said annular cavity.

3. The transmission vent assembly, as defined in claim 1, wherein said tube portion of said vent assembly is press fittingly received within said transmission housing.

4. The transmission vent assembly, as defined in claim 1, wherein said closed end of said cap further comprises supporting areas to contact said filter for retaining filter in said pocket.

5. The transmission vent assembly, as defined in claim 1, wherein said vent body further comprises an annular flange extending radially outward from an upper end of said tube providing a seating surface for seating on said transmission housing, said annular flange extending radially outward to at least an inner diameter of said cap to deflect water spray.

6. The transmission vent assembly, as defined in claim 5, wherein said cylindrical wall of said cap extends close to said annular flange of said vent body to minimize water ingestion.

7. A transmission vent assembly for venting a vehicular transmission comprising:

a vent apparatus having a cylindrical tube portion received in a mounting hole of a transmission housing, a vent body portion integral and adjacent to said tube portion and having an exterior cylindrical surface of greater diameter than said tube portion, and a central bore defining an internal passage extending through a lower end of said tube to an upper surface of said vent body, said central bore having a larger diameter portion defining an open ended pocket formed in said upper surface of said vent body;

a filter disposed in said open ended pocket to capture and condense fluid vapor and return fluid to said transmission through said internal passage;

said vent body including a double lead thread about said exterior cylindrical surface initiating at said upper surface and terminating at a lower end of said vent body and a slot in said upper surface to connect said open ended pocket and said double lead thread;

said transmission vent assembly further comprising a cap, formed in a cup-shape and press fittingly disposed over said vent body, and having a closed end seated on said upper surface of said vent body and a cylindrical wall extending therefrom about said exterior cylindrical surface of said vent body, said cap and said slot cooperate to form a connecting air passage and said cap and said double lead thread cooperate to define a first and a second threaded air passage; and two bidirectional air flow paths extending between said transmission and the atmosphere through said internal passage, said connecting air passage, and each of said two threaded passages, for equalizing pressure in said transmission to the atmosphere.

8. The transmission vent assembly, as defined in claim 7, wherein said tube portion of said vent assembly is press fittingly received within said transmission housing.

9. The transmission vent assembly, as defined in claim 8, wherein said vent body further comprises an annular flange extending radially outward from an upper end of said tube providing a seating surface for seating on said transmission housing, said annular flange extending radially outward to at least an inner diameter of said cap to deflect water spray.

10. The transmission vent assembly, as defined in claim 9, wherein said cylindrical wall of said cap extends close to said annular flange of said vent body to minimize water ingestion.

* * * * *